J. B. FORWOOD.
CATTLE STANCHION.
APPLICATION FILED OCT. 25, 1909.
977,289. Patented Nov. 29, 1910.
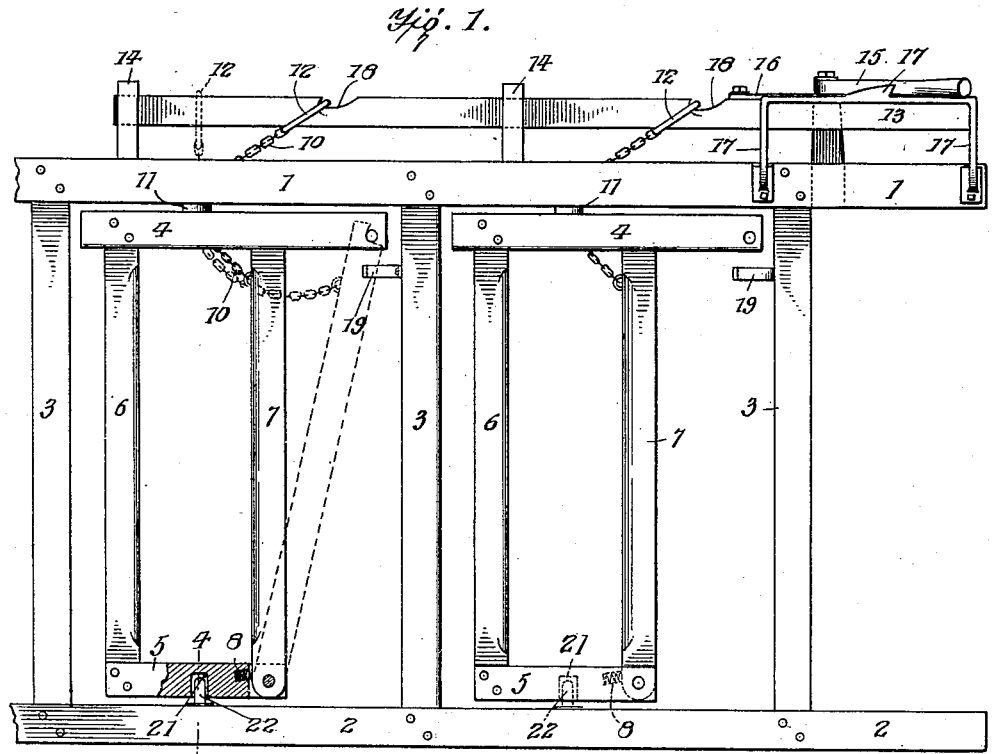
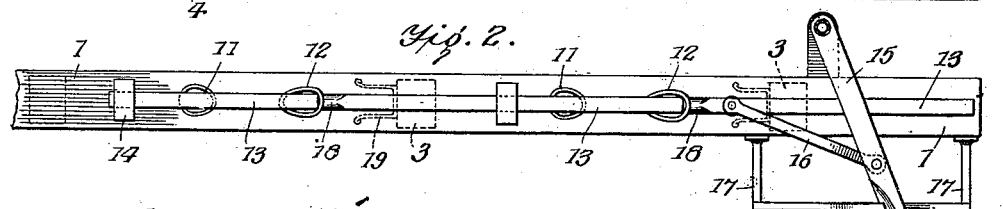
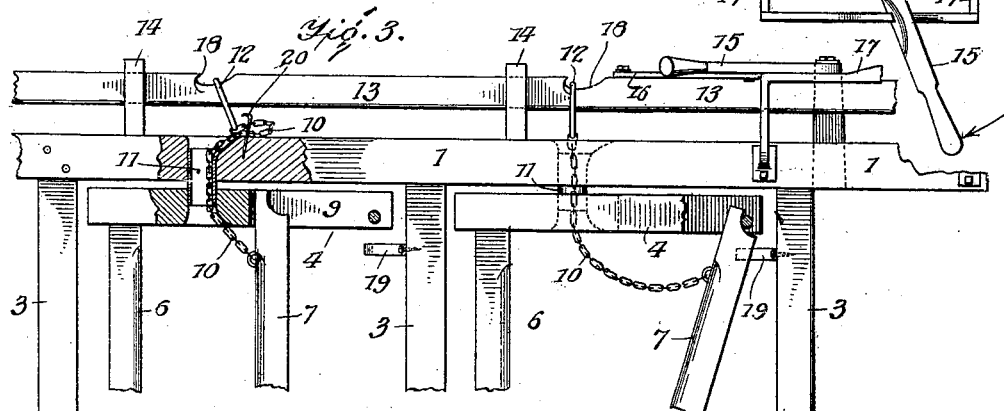
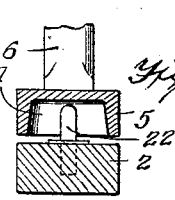
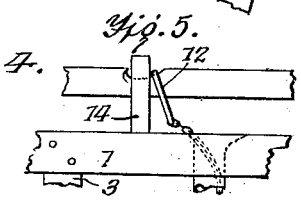
WITNESSES
L. H. Schmidt
Amos W. Hart
INVENTOR
John B. Forwood
BY Munn & Co.
ATTORNEYS
THE NORRIS PETERS CO., WASHINGTON, D. C.

UNITED STATES PATENT OFFICE.

JOHN B. FORWOOD, OF FOREST HILL, MARYLAND.

CATTLE-STANCHION.

977,289.

Specification of Letters Patent.

Patented Nov. 29, 1910.

Application filed October 25, 1909. Serial No. 524,336.

*To all whom it may concern:*

Be it known that I, JOHN B. FORWOOD, a citizen of the United States, and a resident of Forest Hill, in the county of Harford and State of Maryland, have invented certain new and useful Improvements in Cattle-Stanchions, of which the following is a specification.

My invention is an improvement in the class of cattle-stanchions in which a series of stanchions proper are adapted to be operated simultaneously, for securing or releasing a corresponding number of cattle.

The object of my invention is to provide a separate locking and releasing mechanism for the removable bar or bars of one or more stanchions. To this end, I have adopted the construction, arrangement and combination of parts hereinafter described, and illustrated in the accompanying drawing, in which—

Figure 1 is a face view of cattle-stanchions provided with locking and releasing mechanism according to my invention. Fig. 2 is a plan view of the same. Fig. 3 is a face view, partly in section, illustrating details of operation. Fig. 4 is a transverse vertical section on the line 4—4 of Fig. 1; and Fig. 5 is a detail view illustrating an operation of a portion of the apparatus.

As shown in Fig. 1, the cattle-stanchions proper are pivoted at top and bottom in a rigid frame composed of a top bar 1, bottom bar 2, and vertical connecting bars or posts 3. Each stanchion comprises a horizontal top bar 4 and shorter bottom bar 5, a vertical bar 6 which rigidly connects the parts 4 and 5 and a pivoted swinging bar 7 by whose adjustment the cattle are fastened or released as will be presently described. The bar 7 is pivoted to the bottom bar 5, and a spring 8 is arranged thereat for throwing such bar 7 to the right, when released, as indicated by dotted lines, Fig. 1. The upper ends of said bars 7 project into a guide slot 9 in the top bar 4, as shown best in Fig. 2. A chain 10 is attached to the upper end of each swinging bar 7 and passes through the hollow pivot 11 of the stanchion, and is provided with an enlarged loop or ring 12 which is engaged with a locking and releasing bar 13. The latter slides in guides 14 forming fixed attachments of the upper portion 1 of the fixed frame, and is operated, that is to say, reciprocated, by a lever 15 and a connecting rod 16. The said lever 15 is adapted to engage the shoulder of a rack 17 which is secured to the top frame 1.

The locking and releasing bar 13 is provided with a series of notches 18 with which the rings 13 of the chains 10 are adapted to engage as shown. When the sliding bar is adjusted to the right, as shown in Figs. 1 and 2, the chains 10 are hauled taut, and consequently the swinging stanchion bar 7 is drawn into vertical position, or parallel to the fixed stanchion bar 6, as shown by full lines, Fig. 1; contrariwise, when the locking bar 13 is released by shifting the lever 15 to the left, as indicated in Fig. 3, the said bar is slid to the left in the guides 14, and the chains are all released as indicated by dotted lines, Fig. 1, and full lines on the righthand side of Fig. 3. When the chains 10 are thus loosened, the springs 8 force them over to the inclined position, and consequently the cattle are released. When the swinging bars 7 are thrown to the inclined position indicated in Figs. 1 and 2, they engage bifurcating catches 19, which are attached to posts 3 of the main frame, and thus the stanchions are held parallel to the main frame and in position for the cattle to insert their heads between the bars 6 and 7, when it is again desired to fasten them.

It will be understood, therefore, that when the bar 13 is slid to the right and lever 15 is engaged with the rack 17, the chains are all hauled taut and the swinging stanchion bars locked in the vertical position required to fasten the cattle in place; on the other hand, when the lever is released from the rack, the sliding bar releases all the stanchion bars 7 simultaneously.

It is frequently desirable to release all the cattle but one or two, and in such case the chains of the stanchion securing such cattle are fastened by means of a pin 20—see Fig. 3—the same being inserted through a ring of the chain and into a hole or socket provided in the top bar of the fixed frame. The pin may be provided with a handle or enlarged head, for convenience of manipulation. On the other hand, if it be desired to release the other stanchion the rings of the chains securing the movable bars of those particular stanchions are released and loosened, thus allowing the said bars to fall over to the inclined position indicated by dotted lines, Fig. 1; that is to say, the chains are released by slipping their rings 12 out of the engagement with the notches 18 of the bar 13, and allowing the rings to slide along the bar as shown by dotted lines at the left of Fig. 1. When it is again desired to pick up such rings, the bar 13 is slid to the left and the rings engage or come in contact with the guides 13, and thus the bar 13 may slide far enough to pass the notches 18 through the rings. This will be understood by reference to Fig. 5.

The upper bars or cross-pieces 9 of the stanchions are pivoted, as before stated, by means of the sleeves or tubes 11 which serve also as guides for the chains 10, and the tubes 11 are pivoted loosely so as to permit the lower end of the stanchion to swing laterally, or at right angles to the fixed frame 1, 2, 3. Such movement is permitted by means of a slot 21 formed in the lower cross-bar 5 and a pin 22 which is fixed in the lower bar 2 of the fixed frame and projects up into said slot; see Figs. 1 and 4. By forming this slot in the cross-bar 5 instead of the fixed bar 2, the movement is never interfered with by reason of dirt or straw packing in the slot, as would be the case if the slot were formed in the lower piece 2.

What I claim is:

The combination, with a fixed frame having fixed slotted guides on its upper side, stanchions pivoted in said frame and having a hollow pivot at their upper ends, of a bar adapted to slide in the guides and provided with notches, chains attached to the swinging stanchion bars and passing through the hollow pivots and provided with rings adapted to receive said bar and engage the notches therein, the said rings being adapted for individual disengagement from the notches and for contact with said guides, whereby they may be reëngaged with the notches when the bar is slid the requisite distance, substantially as described.

JOHN B. FORWOOD.

Witnesses:
 Louis Dashiell,
 W. Elijah Somerville.